United States Patent [19]

Cupo et al.

[11] Patent Number: 4,815,103
[45] Date of Patent: Mar. 21, 1989

[54] EQUALIZER-BASED TIMING RECOVERY

[75] Inventors: Robert L. Cupo, Eatontown; Cecil W. Farrow, Highlands, both of N.J.

[73] Assignees: American Telephone and Telegraph Company, New York, N.Y.; AT&T Information Systems Inc., Morristown, N.J.

[21] Appl. No.: 113,973

[22] Filed: Oct. 29, 1987

[51] Int. Cl.$^4$ ........................... H04B 3/04; H04L 7/02
[52] U.S. Cl. ...................................... 375/14; 375/106
[58] Field of Search .................... 375/12, 14, 97, 106, 375/119; 328/155; 329/50, 104, 122; 371/42, 46; 364/724

[56] References Cited

U.S. PATENT DOCUMENTS

| | | | |
|---|---|---|---|
| 4,061,978 | 12/1977 | Motley et al. | 375/14 |
| 4,334,313 | 6/1982 | Gitlin et al. | 375/106 |
| 4,343,759 | 8/1982 | Kustka et al. | 375/14 |

Primary Examiner—Benedict V. Safourek
Attorney, Agent, or Firm—Ronald D. Slusky

[57] ABSTRACT

In a data receiver employing a fractionally spaced equalizer, the phase with which samples of the received signal are formed is controlled in response to a signal indicative of the center of gravity of the equalizer coefficient.

24 Claims, 2 Drawing Sheets

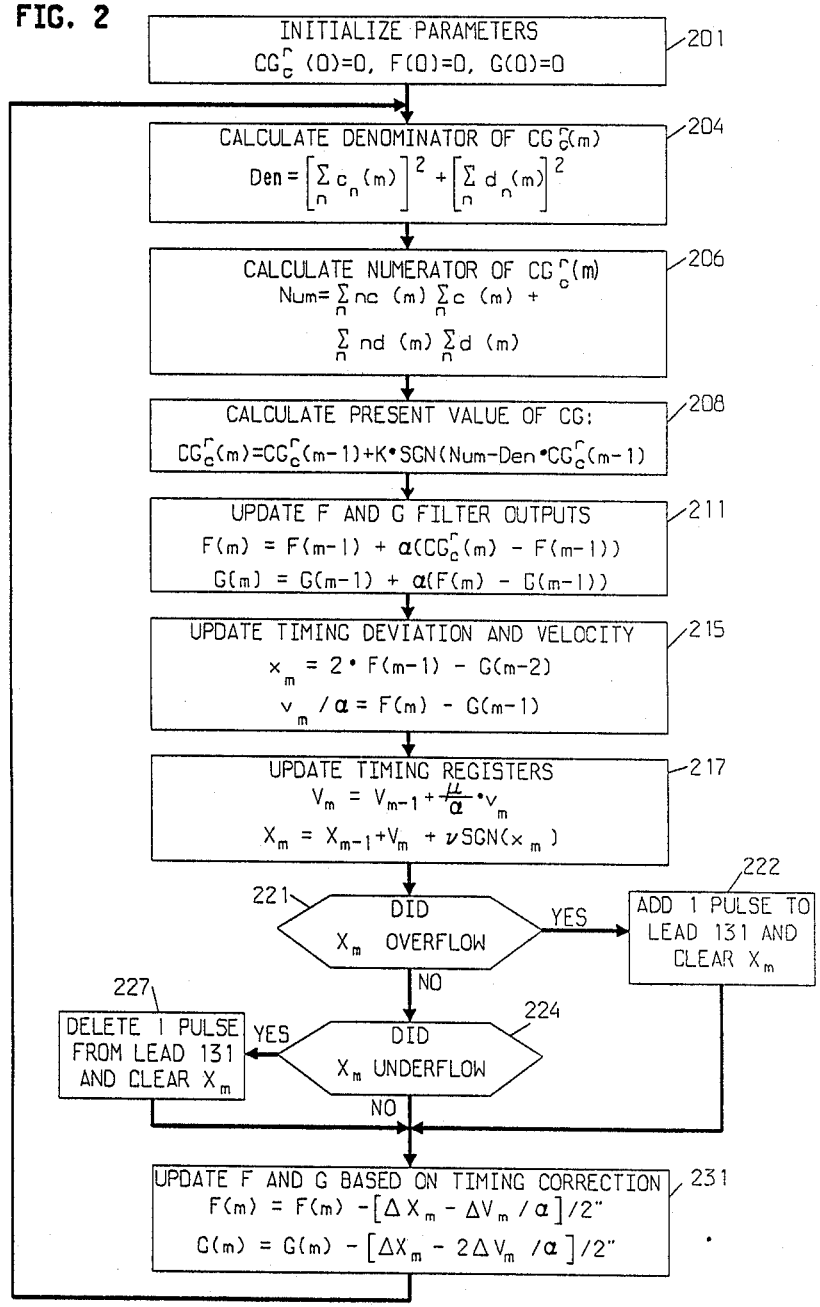

EQUALIZER-BASED TIMING RECOVERY

BACKGROUND OF THE INVENTION

The present invention relates generally to data communications. The invention more particularly relates to timing recovery techniques used in data receivers which have automatic and/or adaptive equalizers.

Accurate reception of high-speed data signals transmitted over a bandlimited channel with unknown transmission characteristics requires the use of an automatic equalizer. The equalizer, which is resident in the receiver portion of a data set, or modem, is generally in the form of a transversal filter. Samples of the received data signal, referred to herein as line samples, are formed at a predetermined sampling rate. In a so-called T/2 equalizer, for example, the line samples are formed at twice the transmitted symbol rate. The line samples are applied to the transversal filter, in which each is multiplied by a respective one of a queue of coefficients. The resulting products are added together and, if necessary, demodulated to generate a baseband signal, referred to herein as an equalizer output. The value of each equalizer output is used as the basis for forming a decision as to the value of a respective transmitted data symbol.

In addition, an error signal is formed equal to the difference between each equalizer output and a reference signal which represents its respective data symbol. In the so-called adaptive type of automatic equalizer in particular, the reference signal is derived from the above-mentioned decision. The error signal is used to update, or adapt, the transversal filter coefficient values in such a way as to minimize a measure of the channel-induced distortion—assumed to be primarily intersymbol interference—in the equalizer outputs.

An important equalizer operating parameter, in addition to the rate at which the line samples are formed, is their time occurrence with respect to the received signal. On the one hand, the coefficient values subsisting in the equalizer at any given time are determined with the received signal having been sampled at a particular set of time points on the received signal. On the other hand, the frequencies of the transmitter and receiver clocks invariably differ from one another, if only by a very small amount. Over time, this frequency difference, if not compensated for, would cause the received signal to be sampled further and further away from the appropriate time points, this phenomenon being referred to as "timing drift". As long as the sampling frequency is high enough, the equalizer does have the ability to compensate for this clock frequency difference (as long as it is not too large) via the coefficient update process. This is not an effective long-term solution, however, because the distribution of coefficient values will eventually become skewed to one end of the coefficient queue and equalizer performance will degrade sharply.

To deal with this problem, the receiver is conventionally provided with a so-called timing recovery circuit. The timing recovery circuit determines whether the line samples are being formed earlier (later) than they should be and, in response, adjusts the phase of the line sample forming circuitry such that the line samples are formed a little later (sooner) then they otherwise would be. This phase adjustment process is referred to as retarding (advancing) the "receiver timing" or, alternatively, as retarding (advancing) the sampling phase.

A commonly used timing recovery technique is so-called envelope-derived timing recovery, disclosed, for example, in the *Bell System Technical Journal,* Vol. 54, p. 569 et seq, March 1975. This technique extracts a symbol-rate tone from the received signal and uses the phase of that tone to control receiver timing. Envelope-derived timing recovery performs satisfactorily for many applications. In some situations, however—such as a narrow rolloff system—the recovered tone may be so weak that accurate timing recovery is not possible when random data is being received.

An alternative timing recovery technique, referred to herein as "coefficient tracking", controls receiver timing as a function of coefficient distribution within the queue. One such technique is disclosed in U.S. Pat. No. 4,004,226, issued Jan. 18, 1977 to S. U. H. Qureshi et al. A particular coefficient location—typically at or near the queue midpoint—is designated as the one at which the coefficient with the largest magnitude should reside. Periodically, e.g., in each symbol interval, the coefficient which actually has the largest magnitude is identified. If it is found to be at the designated location, no timing adjustment is made. Otherwise, the receiver timing is advanced or retarded, as appropriate, by a predetermined fixed timing adjustment increment such that subsequent coefficient adaptation over a number of symbol intervals causes the largest coefficient to appear at the designated location.

Another coefficient tracking timing recovery technique is disclosed in U.S. Pat. No. 4,334,313, issued Jan. 8, 1982 to R. D. Gitlin et al. In accordance with that technique, the coefficient queue is divided into front and back portions only. When the largest coefficient is found in the front portion, receiver timing is retarded. If it is found in the back portion, receiver timing is advanced.

Although coefficient tracking seems to be generally satisfactory, it can lead to instabilities, at least in theory. In addition, coefficient tracking is not particularly amenable to quantitative analysis, making it difficult to "fine-tune" the timing recovery process.

SUMMARY OF THE INVENTION

As in coefficient tracking, the present invention uses the values of the equalizer coefficients as the basis for timing recovery. However, rather than search for the largest coefficient, our technique uses a parameter we refer to as the "center of gravity" of the equalizer coefficients. Specifically, we have discovered that the center of gravity of the coefficients is a direct measure of the timing offset and that, therefore, its time rate of change is a measure of the timing drift. Thus by computing the center of gravity (or at least a quantity that is reflective of the value thereof) on a periodic basis, the current timing offset and drift can be determined and the receiver timing can be adjusted so as to reduce these toward zero.

This approach has a number of advantages. In particular, it provides a quantitative measure of timing drift and offset, thereby facilitating rapid and accurate timing adjustments. Also, being an equalizer-based timing recovery scheme, timing can be recovered on any channel capable of equalization. Such is not the case in, for example, an envelope-derived recovery scheme when there is an absence of signal energy at the band edges.

BRIEF DESCRIPTION OF THE DRAWING

In the drawing,

FIG. 2 depicts a flowchart of the timing recovery technique used within the receiver of FIG. 1 in accordance with the invention.

DETAILED DESCRIPTION

Figure 1:
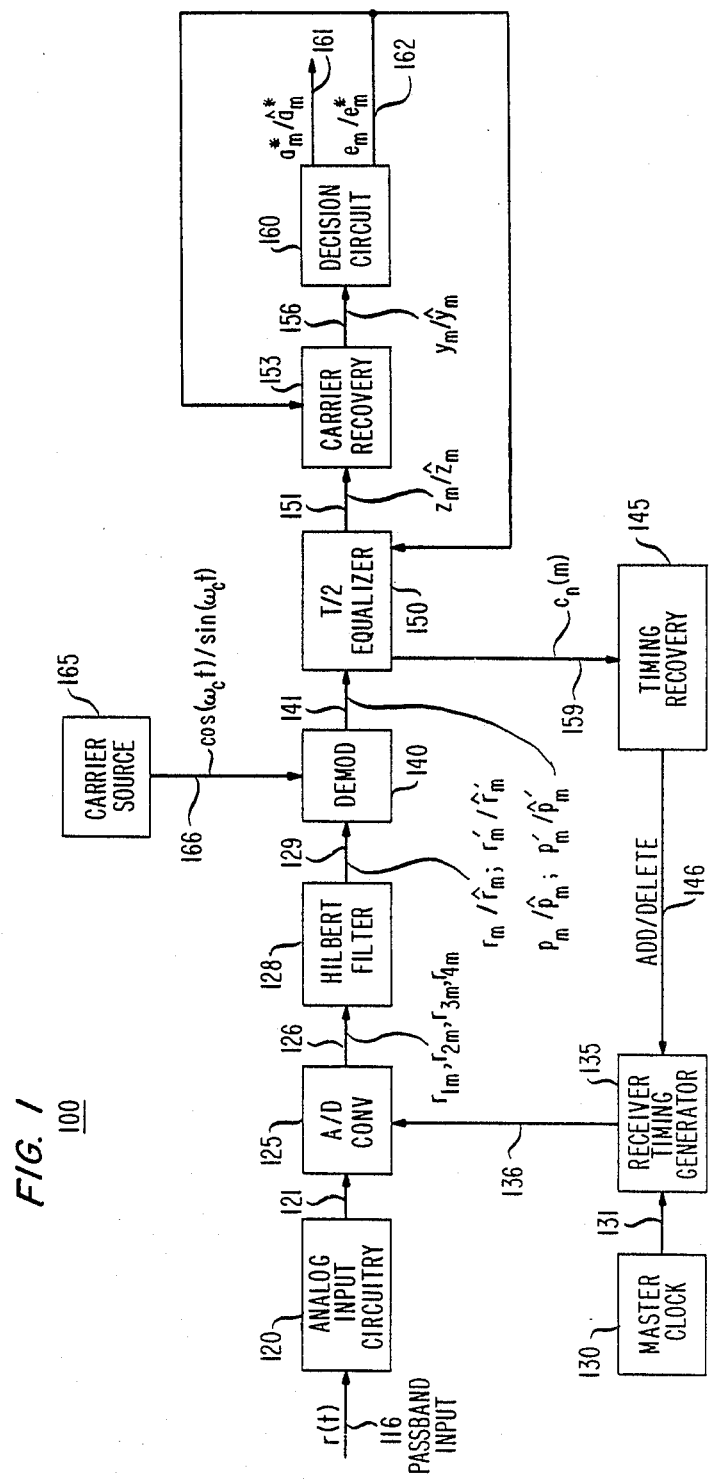
FIG. 1 shows an illustrative embodiment of a data signal receiver which includes timing recovery circuitry embodying the principles of the invention.

Receiver 100 shown in FIG. 1 is adapted for use in a voiceband data modem in a communication system employing quadrature-amplitude modulation (QAM). Four information bits are communicated once every $T = 1/2400$ sec. The symbol rate is thus 2400 baud, yielding a binary data transmission rate of 9600 bits per second. It will, of course, be appreciated that the invention is applicable to transmission systems using other modulation schemes as well as to baseband systems and can be used in systems using other baud and bit rates.

The four bits to be transmitted are encoded into two signal levels, each of which can take on one of the four values $+1$, $-1$, $+3$, $-3$. The two signal levels amplitude modulate respective 1800 Hz in-phase and quadrature-phase carrier waves which, in combination, comprise the transmitted QAM signal.

The QAM signal, representing a succession of data symbols transmitted at a rate of $1/T$ symbols per second, is received by receiver 100 on lead 116. This passband input signal, $r(t)$, passes to analog input circuitry 120, principally comprised of a bandpass filter. The output of circuitry 120 on lead 121 is passed to an A/D converter 125.

A master clock 130 generates 4096 master clock pulses every T seconds on lead 131. These are received by receiver-timing generator 135. The latter counts the pulses on lead 131 and generates timing signals on a number of output leads to control the sequencing of the various signal processing functions within the receiver. One of these leads, shown explicitly, is lead 136. The latter extends pulses to A/D converter 125 at a rate which causes A/D converter 125 to generate line samples at 4/T samples per second. A/D converter 125 thus generates four passband line samples $r_{1m}$, $r_{2m}$, $r_{3m}$ and $r_{4m}$ during the $m^{th}$ receiver symbol interval. These are passed to Hilbert filter 128 which, for each symbol interval, generates on lead 129 digital Hilbert transform pair $r_m/\hat{r}_m$ and digital Hilbert transform pair $r'_m/\hat{r}'_m$. That is, a Hilbert transform pair appears on lead 129 once every T/2 seconds.

The aforesaid Hilbert transform pairs are demodulated to baseband in demodulator 140 to form baseband pairs $p_m/\hat{p}_m$; $p'_m/\hat{p}'_m$ on lead 141. One can think of $p_m$ and $\hat{p}_m$ ($p'_m$ and $\hat{p}'_m$) as the real and imaginary parts of a complex baseband sample $P_m$ ($P'_m$). In performing the demodulation, demodulator 140 uses the values of $\cos(\omega_c t)$ and $\sin(\omega_c t)$ which it receives from carrier source 165 on lead 166, $\omega_c$ being the radian carrier frequency.

(It should be noted at this point that, due to processing delays, baseband pairs $p_m/\hat{p}_m$; $p'_m/\hat{p}'_m$ are not necessarily generated during the $m^{th}$ receiver interval, the latter being defined as the T-second interval during which line samples $r_{1m}$, $r_{2m}$, $r_{3m}$ and $r_{4m}$ are generated. The subscript m thus does not identify when the baseband pairs are generated but, rather, identifies them as being derived from samples $r_{1m}$, $r_{2m}$, $r_{3m}$ and $r_{4m}$. Similar considerations apply to all of the m-subscripted variables herein.)

The baseband pairs on lead 141 are passed to finite-impulse-response equalizer 150 of conventional design.

Since the equalizer receives and processes more than one input for each symbol interval, it is referred to as a "fractionally spaced" equalizer and, more specifically, as a T/2 type of fractionally spaced equalizer since it receives and processes inputs at a two-per-symbol-interval rate. The outputs of equalizer 150 on lead 151 are generated once per symbol interval and are, respectively, the real and imaginary components $z_m$ and $\hat{z}_m$ of a baseband equalizer output $Z_m$.

The components of baseband equalizer output $Z_m$ pass to carrier recovery circuit 153 which corrects for discrepancies in the phase of the carrier signal generated by carrier source 165 with respect to the modulating carrier signal in the transmitter. Such discrepancies are due, for example, to transmitter/receiver frequency and/or carrier phase differences, channel-induced phase offset, etc. In particular, carrier recovery circuit 153 responds to the error on lead 162 (generated as described below) to form, in conventional fashion, a phase correction estimate $\theta^*_m$. Circuit 153 then applies that correction to baseband equalizer output $Z_m$ by multiplying $Z_m$ by $e^{-j\theta^*_m}$ to generate on lead 156 a phase-corrected signal $Y_m$ having real and imaginary components $y_m$ and $\hat{y}_m$.

Components $y_m$ and $\hat{y}_m$ are quantized in decision circuit 160. The resulting outputs, provided on lead 161, are decisions $a^*_m$ and $\hat{a}^*_m$ as to the signal levels which represent components $a_m$ and $\hat{a}_m$ of a particular transmitted symbol $A_m$. Decisions $a^*_m$ and $\hat{a}^*_m$ can be thought of as the real and imaginary components of a complex decision $A^*_m$.

Decision circuit 160 also provides on lead 162 the real and imaginary components of a complex baseband error signal $E_m$ having real and imaginary components $e_m$ and $\hat{e}_m$, where $e_m = (y_m - a^*_m)$ and $\hat{e}_m = (\hat{y}_m - \hat{a}^*_m)$. These are supplied on lead 162 to carrier recovery circuit 153, as noted above, and are also extended to equalizer 150 for the purpose of coefficient updating.

In particular, for each symbol interval, equalizer 150 multiplies the $(2M+2)$ newest, i.e., most-recently formed, baseband samples applied thereto by respective complex coefficients stored therein and forms the sum of the resulting products to form equalizer output $Z_m$ in accordance with $$Z_m = \sum_{i=-M/2}^{M/2} [C_{2i-1}(m)P_{m-i+1} + C_{2i}(m)P'_{m-i+1}]. \quad (1)$$

In Eq. (1), the $C_i(m)$'s are complex-valued coefficients each having a particular value associated with the $m^{th}$ receiver symbol interval. Each odd-indexed coefficient $C_1(m)$, $C_3(m)$, etc. is multiplied by a respective one of the "unprimed" samples $P_m$, $P_{m-1}$, etc., while each even-indexed coefficient $C_2(m)$, $C_4(m)$, etc. is multiplied by a respective one of the "primed" samples $P'_m$, $P'_{m-1}$, etc. The values of the entire ensemble of coefficients at any point in time define the transfer function of the equalizer.

Upon having generated $Z_m$ in accordance with Eq. (1), equalizer 150 thereupon updates the coefficient values stored therein to provide coefficient values associated with the $(m+1)^{st}$ symbol interval. The updating rules illustratively used are $$C_{2i-1}(m+1) = C_{2i-1}(m) - \beta E_{m-d}P_{m-i-d+1} - \gamma[-C_{2i-1}(m)] \quad (2)$$

$$C_{2i}(m+1) = C_{2i}(m) - \beta E_{m-d} P'_{m-i-d+1} - \gamma[-C_{2i}(m)] \quad (3)$$

where $\beta$ and $\gamma$ are selected constants. The parameter d is a predetermined number—illustratively equal to 2—whose introduction into the updating rules takes account of the delay between generation of baseband samples $P_m$ and $P'_m$ and the generation of error signal $E_m$. The updating rules of Eqs. (2) and (3) embody the so-called stochastic mean-squared error updating algorithm, with the final term in each of these equations representing so-called "tap leakage".

The updated coefficient values, in addition to being used internally within equalizer 150, are passed on lead 159 to timing recovery circuit 145. The latter determines, based on the principles of the invention, whether receiver timing should be advanced or retarded (if either) and provides a signal indicative of same on add-/delete lead 146, which extends to receiver timing generator 135. The latter, in turn, then appropriately adjusts the phase of the pulses on lead 136, and, therefore, the phase with which the samples on lead 126 are formed, by either deleting (ignoring) one of the clock pulses on lead 131 or adding an extra one, depending on whether receiving timing is to be advanced or retarded.

The theoreticl underpinings of our invention, which is directed to the timing recovery technique performed within timing recovery circuit 145, will now be described. For simplicity, this discussion assumes a one- as opposed to two-dimensional signal so that signal samples and coefficients can be represented by real, as opposed to complex, values. The discussion is equally valid for the two-dimensional case, however.

Assume that a pulse defined by a sequence of samples $$p = [p_{-K}, p_{-K+1}, \ldots p_0 \ldots p_{K-1}, p_K] \quad (4)$$

is applied to a finite-impulse-response equalizer whose transfer function is defined by a sequence of coefficients $$c = [c_{-L}, c_{-L+1}, \ldots c_0 \ldots c_{L-1}, c_L] \quad (5)$$

thereby providing a filtered output sequence given by $$z = [z_{-(L+K)}, z_{-(L+K)+1}, \ldots z_0 \ldots z_{(L+K-1)}, z_{(L+K)}], \quad (6)$$

where the elements of z are $$z_q = \sum_n C_n \cdot p_{q-n}. \quad (7)$$

We define the center of gravity of the pulse and the center of gravity of the coefficients as $$CG_p = \frac{\sum_n n \cdot p_n}{\sum_n p_n} \text{ and } CG_c = \frac{\sum_n n \cdot c_n}{\sum_n c_n} \quad (8)$$

respectively. We similarly define the center of gravity of the filtered output sequence as $$CG_z = \frac{\sum_q q \cdot z_q}{\sum_q z_q} \quad (9)$$

which, upon substituting (7), yields:

$$CG_z = \frac{\sum_q q \sum_n c_n \cdot p_{q-n}}{\sum_q \sum_n c_n \cdot p_{q-n}} \quad (10)$$

One of the significant underpinnings of our invention is our realization that the centers of gravity above are related by the relation $$CG_z = CG_p + CG_c, \quad (11)$$

which can be shown by first writing $$CG_p + \quad (12)$$

$$CG_c = \frac{\sum_n n \cdot p_n}{\sum_n p_n} + \frac{\sum_n n \cdot c_n}{\sum_n c_n}$$

$$= \frac{\left(\sum_n n \cdot p_n\right) \cdot \left(\sum_n c_n\right) + \left(\sum_n n \cdot c_n\right) \cdot \left(\sum_n p_n\right)}{\left(\sum_n p_n\right) \cdot \left(\sum_n c_n\right)}.$$

Considering the $m^{th}$ element of p and the $l^{th}$ element of c, this expands to $$CG_p + CG_c = \frac{\ldots + m \cdot p_m \cdot c_l + l \cdot c_l \cdot p_m + \ldots}{\ldots + p_m \cdot c_l + \ldots} \quad (13)$$

$$= \frac{\ldots (l + m) \cdot c_l \cdot p_m + \ldots}{\ldots + p_m \cdot c_l + \ldots}$$

Now expanding Eq. (10), we can write $$CG_z = \frac{\sum_n n \cdot z_n}{\sum_n z_n} = \frac{\sum_k k \cdot \left(\sum_n c_n \cdot p_{k-n}\right)}{\sum_k \sum_n c_n \cdot p_{k-n}} = \quad (14)$$

$$\frac{\ldots + k \cdot c_l \cdot p_{k-l} + \ldots}{\ldots + c_l \cdot p_{k-1} + \ldots}$$

Finally, substituting k for (l+m) in Eq. (13), we see that Eqs. (13) and (14) are equivalent and, therefore, $CG_p + CG_c = CG_z$.

Stated in words, then, the "position" of the output sequence z—defined, somewhat arbitrarily, as the position of its center of gravity—is given by the sum of the center of gravity, or "position", of the unfiltered pulse and the center of gravity of the filter coefficients.

Equation (11) can be rewritten as $$CG_c = CG_z - CG_p, \quad (15)$$

thus showing that the center of gravity of the coefficients is, in fact, a numerical measure of the change in the position of the pulse p after it has been filtered. This change, however, is simply the delay introduced by the equalizer. Thus it is seen that once the desired delay has been decided upon—this typically being half the "length" of the equalizer, i.e., half the time it takes for a sample to pass all the way through it—the current value of c can be used to determine whether that delay is greater or less than the desired amount and by how much.

Specifically, if the index n is defined as spanning a range of positive and negative values with n=0 being the desired position of the sampled pulse within the equalizer, then the coefficient center of gravity $CG_c$ is, in fact, a measure of the distance, measured in units of half-symbol periods (since there are two coefficients per symbol), between the desired and present position of the sampled pulse, that distance being referred to herein as the "timing offset". In addition, the observed rate of change of $CG_c$ over time can be used to determine the amount of timing "drift", i.e., the difference in symbol clock frequency between the transmitter and receiver. The receiver timing can then be adjusted as appropriate to both (a) match the receiver symbol clock to that of the transmitter so as to halt further drift and (b) adjust the equalizer delay to that desired, i.e., remove the timing offset.

Timing recovery circuitry 145 implements the foregoing by maintaining a variable $X_m$. The value of this variable is updated, i.e., incremented or decremented, for each symbol interval as a function of (a) a parameter $\Delta X_m$, whose value is related to the present timing offset, and (b) a parameter $V_m$, whose value is related to the present rate of change thereof, i.e., timing drift. In particular, $X_m$ is updated in accordance with the relation $$X_{m+1} = X_m + \Delta X_m + V_m. \tag{16}$$

That is, the value of this variable associated with the $(m+1)^{st}$ symbol interval is given by its value associated with $m^{th}$ symbol interval updated by the values of $\Delta X_m$ and $V_m$. Once the magnitude of $X_m$ exceeds a predetermined threshold in a positive (negative) direction, this is indicative of a situation in which the timing offset and/or timing drift have been sufficiently positive (negative) over some preceding number of symbol intervals that an advance (retarding) of receiver timing is deemed appropriate and such a timing adjustment is thereupon made. The value of $X_m$ is then reset to zero and the process continues. In this embodiment, $\Delta X_m$ and $V_m$ have small fractional values and the threshold for $X_m$ is of magnitude unity.

Specifically, the parameter $\Delta X_m$ is illustratively given by $$\Delta X_m = v \cdot SGN(x_m), \tag{17}$$

where $v$ is a predetermined constant, SGN is a function whose magnitude is unity and whose sign is the sign of its argument, and $x_m$ is the present timing offset. The value of $x_m$ is determined, in accordance with the invention, from the coefficient center of gravity as discussed hereinbelow. Thus whenever the timing offset is positive (negative), an increment of fixed magnitude is added to (subtracted from) $X_m$ in each successive symbol interval.

The other parameter in Eq. (16), viz., the parameter $V_m$, takes account of timing drift, which is principally due to the inevitable (albeit possibly very small) discrepancy between the transmitter and receiver master clock frequencies. This discrepancy, if not accounted for, would manifest itself in the form of an ongoing incremental change in the magnitude of the timing offset. By adding $V_m$ (which may have either a positive or a negative value) to $X_m$ for each symbol interval, we effectively cancel the incremental change in timing offset that would otherwise occur.

Like $X_m$, the parameter $V_m$ is also arrived at through an iterative updating process, viz., $$V_m = V_{m-1} + \Delta V_m. \tag{18}$$

The parameter $\Delta V_m$ is illustratively given by $$\Delta V_m = \frac{\mu}{\alpha} v_m \tag{19}$$

where $\mu$ and $\alpha$ are predetermined constants and $v_m$ is the present rate of change, or "velocity", of the timing offset. The value of $v_m$, like the value of $x_m$, is determined, in accordance with the invention, from the coefficient center of gravity, as discussed hereinbelow.

The parameter $v_m$ will be non-zero as long as $V_m$ has not reached a steady-state value. Thus, the value of $V_m$ is subject to a continual updating until, in fact, a steady-state value is reached, that value being such as to substantially compensate for what would otherwise be a continual timing drift principally due, as mentioned above, to transmitter/receiver clock frequency differences. From that point on, the value of $v_m$, and thus of $\Delta V_m$, will be substantially zero.

In general, it is desirable to assure that timing changes are made in small increments over time. It is for this reason that the magnitude of $\Delta X_m$ is not a function of the magnitude of $x_m$ but, rather, only of its sign. Specifically, if the magnitude of $\Delta X_m$ were to be a function of the magnitude of $x_m$, $v$ would have to be made sufficiently small to ensure that $\Delta X_m$ would not be unduly large when $x_m$ took on its maximum value. Such a small value of $v$ would, however, result in an inadequately long timing adjustment when $x_m$ was small. Using $\Delta X_m = v \cdot SGN(x_m)$ solves this problem.

On the other hand, $v_m$ takes on a sufficiently small range of values—its maximum value being limited by the maximum allowable frequency deviation in the modem master clock—that, by judicious choice of the values of $\mu$ and $\alpha$, the magnitude of $v_m$ can be used in determining $\Delta V_m$ without engendering unduly abrupt timing changes.

In summary, then, the values of $\mu$, $\alpha$ and $v$ are chosen in such a way as to ensure that the timing recovery technique can, in fact, account for worst-case timing drift and correct for same in a reasonable time period without, on the other hand, making timing adjustments too abruptly. Illustratively, $\mu = 2^{-8}$, $\alpha = 2^{-8}$, and $v = 2^{-12}$.

In order to determine $x_m$ and $v_m$ from the coefficient center of gravity pursuant to the invention, timing recovery circuit 145 needs, first of all, to determine that center of gravity. Since the equalizer coefficients are complex numbers, their center of gravity is likewise a complex number. It turns out, however, that all timing information is contained within the real part of that complex number. Timing recovery circuit 145 therefore works strictly with the real part of the center of gravity.

In particular, if the $n^{th}$ (complex) coefficient, $C_n(m)$, of the overall coefficient queue is represented as the complex number $c_n(m) + jd_n(m)$, then the coefficient center of gravity associated with the $m^{th}$ symbol interval can be written as $$CG_c(m) = \frac{\sum_n n \cdot C_n(m)}{\sum_n C_n(m)} = \frac{\sum_n n \cdot (c_n(m) + jd_n(m))}{\sum_n c_n(m) + jd_n(m)}. \quad (20)$$

Thus the real part of the coefficient center of gravity associated with the $m^{th}$ symbol interval, denoted $CG_c{}^r(m)$, is given by $$CG_c{}^r(m) = \frac{\sum_n nc_n(m) \sum_n c_n(m) + \sum_n nd_n(m) \sum_n d_n(m)}{\left(\sum_n c_n(m)\right)^2 + \left(\sum_n d_n(m)\right)^2} \quad (21)$$

Computing $CG_c{}^r(m)$ from Eq. (21) obviously involves performing a division. However, timing recovery circuit 145 is illustratively implemented as a programmed digital signal processing (DSP) chip on which division is relatively slow and awkward. To get around this, circuit 145 approximates $CG_c{}^r(m)$ using the following adaptive division:

$$CG_c{}^r(m) = CG_c{}^r(m-1) + k \cdot SGN[\text{Num} - \text{Den} \cdot CG_c{}^r(m-1)] \quad (22)$$

where Num and Den are, respectively, the numerator and denominator from Eq. (21). The parameter k is chosen taking into account the fact that the maximum difference in freqwuency between the transmitter and receiver clocks is 1 part in 5000 so that, in particular, $1/5000 < k \ll 1$. Moreover, by choosing k sufficiently small, the adaptive division represented by Eq. (22) serves as a smoothing filter on the measured center of gravity. Illustratively, $k=2^{-8}$. It will, of course, be appreciated that center-of-gravity signal $CG_c{}^r(m)$ is not precisely equal to the coefficient center of gravity, due to the fact that $CG_c{}^r(m)$ is computed via an approximation process. It is, however, a signal which is indicative of the center of gravity and, as such, is wholly adequate to carry out the present timing recovery technique.

FIG. 2 is a flowchart of the processing performed within timing recovery circuit 145. As shown therein, timing recovery circuit 145, after first initializing $CG_c{}^r(0)$ and two parameters $F(0)$ and $G(0)$ (discussed below) all to zero at step 201, proceeds to calculate Den and Num from Eq. (22) at steps 204 and 206. $CG_c{}^r(m)$ is then determined at step 208. As indicated at step 211, $CG_c{}^r(m)$ is then filtered by passing it through a first stage of linear filtering to generate a filtered signal $F(m)$ in accordance with $$F(m) = F(m-1) + \alpha[CG_c{}^r(m) - F(m-1)] \quad (23)$$

In Eq. (23), $\alpha$ is the same $\alpha$ used in Eq. (19). $F(m)$ is then passed through a second stage of linear filtering to generate a filtered signal $G(m)$ in accordance with $$G(m) = G(m-1) + \alpha[F(m) - G(m-1)] \quad (24)$$

As shown in step 215, the variables $x_m$ and $v_m$—actually a scaled version thereof $v_m/\alpha$—are then determined from $F(m)$ and $G(m)$ in accordance with $$x_m = 2F(m-1) - G(m-2) \quad (25)$$

$$\frac{v_m}{\alpha} = F(m) - G(m-1) \quad (26)$$

Equations (25) and (26) are arrived at by simply rearranging terms in the expression $$\alpha[x_m - F(m-1)] = \alpha[F(m) - G(m-1)] = v_m, \quad (27)$$

the validity of which can be verified by equating $x_m$ with $CG_c{}^r(m)$ in Eq. (23)—since, as discussed above, the timing offset $x_m$ is, in fact, represented by the coefficient center of gravity $CG_c{}^r(m)$—and then substituting from Eqs. (23) and (24) into Eq. (27).

Given the values of $x_m$ and $v_m/\alpha$ from step 215, timing recovery circuit 145 can then update, in accordance with Eqs. (16) and (18), the registers that it uses to hold $V_m$ and $X_m$, as shown at step 217. It is then determined at step 221 whether $X_m$ has overflowed, i.e., exceeded $+1$. If it has, then at step 222, a pulse is added to lead 131, as previously noted, and $X_m$ is cleared to zero. Alternatively, if it is determined at step 224 that $X_m$ has underflowed, i.e., become more negative than $-1$, then at step 227, a pulse is deleted from lead 131 and, again, $X_m$ is cleared to zero.

At this point, $F(m)$ and $G(m)$—whose values will be used at steps 211 and 215 in the next symbol interval (where they will appear as $F(m-1)$ and $G(m-1)$, respectively)—must be updated. The reason for this is that having changed $X_m$ (at step 217), we have effectively changed the value of $x_m$. The values of $F(m)$ and $G(m)$ must therefore be adjusted so as to be consistent with the new implicit value of $x_m$ carried forward into the next symbol interval.

Specifically, in order to determine the amount by which $F(m)$ and $G(m)$ should be adjusted, we iteratively substitute in Eq. (23) the expression for $F(m-1)$ derived from Eq. (23) itself, i.e., $$F(m-1) = F(m-2) + \alpha[CG_c{}^r(m) - F(m-2)],$$

and so forth for a large value of m, and making the assumption that $v_m$ is a constant equal to $[CG_c{}^r(m) - CG_c{}^r(m-1)]$ for all m—an assumption that, indeed, is justifiable because of the corrections that are in fact made to $F(m)$ and $G(m)$ for each symbol interval—then we arrive at $$F(m) = x_m - \frac{(1-\alpha)v_m}{\alpha}.$$

By assuming that $(1-\alpha)$ is approximately equal to unity, we can write $$F(m) = x_m - \frac{v_m}{\alpha} \quad (27)$$

Following the same approach, it can be shown that $$G(m) = x_m - \frac{2v_m}{\alpha} \quad (28)$$

From Eqs. (27) and (28), then, we see that when $X_m$ and $V_m$ are changed by $\Delta X_m$ and $\Delta V_m$, respectively, then the corresponding changes in $F(m)$ and $G(m)$ are $$[\Delta X_m - \Delta V_m/\alpha]/2^{11} \quad (29)$$

for F(m) and $$[\Delta X_m - 2\Delta V_m/\alpha]/2^{11} \quad (30)$$

for G(m). The factor of $2^{11}$ comes about by virtue of the fact that F(m) and G(m) are in units of half-symbol periods while $\Delta X_m$ and $\Delta V_m$ are in units of $2^{-11}$ half-symbol periods because each unit change in $X_m$ causes a receiver timing change of 1/4096, i.e., $2^{-12}$ symbol periods = $2^{-11}$ half-symbol periods.

The adjustments set forth in Eqs. (29) and (30) are subtracted from F(m) and G(m) at step 231.

One particular point that needs to be addressed relates to the fact that in the present embodiment, fixed carrier demodulation is performed prior to equalization; in typical applications, all demodulation is performed after equalization. The reason this is desirable is that CG(m) can be shown to be equal to the equalizer zero-frequency group delay. However, for a passband equalizer, i.e., one which operates on passband, non-demodulated samples, there is substantially no zero-frequency energy, at least in typical voiceband applications. Performing the demodulation after equalization, then, would not yield a meaningful coefficient center of gravity computation. The zero-frequency group delay for a baseband equalizer, by contrast, is relatively smooth, flat and "well-behaved". Hence the use of demodulation before the equalizer.

The foregoing merely illustrates the principles of the invention. Thus, for example, although the receiver of FIG. 1 is shown as being comprised of individual hardware elements, the equivalent signal processing may be carried out using one or more programmed processors operating under the control of microcode, firmware, software, etc. And, of course, the various frequencies and other numerical parameters set forth herein are merely illustrative and will differ in varying applications.

It is thus the case that those skilled in the art will be able to devise numerous arrangements which, although not explicitly shown herein, embody the principles of the invention.

What is claimed is:

1. Apparatus comprising
    means for forming a succession of samples in response to a received signal,
    means for filtering said samples by summing the products of a plurality of coefficients with respective ones of said samples, and
    timing recovery means for adjusting the phase with which said samples are formed in response to a center-of-gravity signal indicative of the center of gravity of said coefficients.

2. The invention of claim 1 wherein the $n^{th}$ of said coefficients has a value $C_n(m)$ and said center of gravity is equal to $$\frac{\sum_n n \cdot C_n(m)}{\sum_n C_n(m)}.$$

3. The invention of claim 2 wherein said coefficients are complex numbers and wherein said signal indicative of the center of gravity is the real component of said center of gravity.

4. The invention of claim 2 wherein said received signal is a modulated signal and wherein said sample forming means includes means for forming said samples at baseband.

5. Apparatus comprising
    means for forming a succession of samples in response to a received signal representing a succession of data symbols,
    means for forming a decision as to the value of each one of said symbols in response to the sum of the products of an ordered plurality of coefficients with respective ones of said samples,
    means for updating the values of said coefficients, and
    timing recovery means for adjusting the phase with which said samples are formed in response to a center-of-gravity signal indicative of the center of gravity of said coefficients.

6. The invention of claim 5 wherein the $n^{th}$ of said coefficients has a value $C_n(m)$ and said center of gravity is equal to $$\frac{\sum_n n \cdot C_n(m)}{\sum_n C_n(m)}.$$

7. The invention of claim 6 wherein said coefficients are complex numbers and wherein said signal indicative of the center of gravity is the real component of said center of gravity.

8. The invention of claim 6 wherein said received signal is a modulated signal and wherein said sample forming means includes means for forming said samples at baseband.

9. Apparatus comprising
    means for forming a succession of samples in response to a received signal representing a succession of data symbols,
    equalizer means for forming an equalized signal associated with an individual one of said data symbols, said equalized signal being a function of the products of a plurality of coefficients with respective ones of said samples, said coefficients having respective values associated with said one of said data symbols,
    means for forming, in response to said equalized signal, a decision as to the value of said one of said data symbols and an error signal indicative of the difference between said equalized signal and said decision,
    means for updating the values of said coefficients for use by said equalizer means in the forming of an equalized signal associated with a subsequent one of said data symbols, and
    timing recovery means for adjusting the phase of said sample forming means in response to a center-of-gravity signal indicative of the center of gravity of at least ones of said coefficients.

10. The invention of claim 9 wherein the $n^{th}$ of said coefficients has a value $C_n(m)$ and said center of gravity is equal to $$\frac{\sum_n n \cdot C_n(m)}{\sum_n C_n(m)}.$$

11. The invention of claim 10 wherein said coefficients are complex numbers and wherein said signal indicative of the center of gravity is the real component of said center of gravity.

12. The invention of claim 10 wherein said received signal is a modulated signal and wherein said sample forming means includes means for forming said samples at baseband.

13. A method comprising the steps of
forming a succession of samples in response to a received signal,
filtering said samples by summing the products of a plurality of coefficients with respective ones of said samples, and
adjusting the phase with which said samples are formed in response to a center-of-gravity signal indicative of the center of gravity of said coefficients.

14. The invention of claim 13 wherein the $n^{th}$ of said coefficients has a value $C_n(m)$ and said center of gravity is equal to $$\frac{\sum_n n \cdot C_n(m)}{\sum_n C_n(m)}.$$

15. The invention of claim 14 wherein said coefficients are complex numbers and wherein said signal indicative of the center of gravity is the real component of said center of gravity.

16. The invention of claim 14 wherein said received signal is a modulated signal and wherein said samples are at baseband.

17. A method comprising the steps of
forming a succession of samples in response to a received signal representing a succession of data symbols,
forming a decision as to the value of each one of said symbols in response to the sum of the products of an ordered plurality of coefficients with respective ones of said samples,
updating the values of said coefficients, and
adjusting the phase with which said samples are formed in response to a center-of-gravity signal indicative of the center of gravity of said coefficients.

18. The invention of claim 17 wherein the $n^{th}$ of said coefficients has a value $C_n(m)$ and said center of gravity is equal to $$\frac{\sum_n n \cdot C_n(m)}{\sum_n C_n(m)}.$$

19. The invention of claim 17 wherein said coefficients are complex numbers and wherein said signal indicative of the center of gravity is the real component of said center of gravity.

20. The invention of claim 17 wherein said received signal is a modulated signal and wherein said samples are at baseband.

21. A method comprising the steps of
forming a succession of samples in response to a received signal representing a succession of data symbols,
forming an equalized signal associated with an individual one of said data symbols, said equalized signal being a function of the products of a plurality of coefficients with respective ones of said samples, said coefficients having respective values associated with said one of said data symbols,
forming, in response to said equalized signal, a decision as to the value of said one of said data symbols and an error signal indicative of the difference between said equalized signal and said decision,
updating the values of said coefficients for use in said equalized signal forming step in the forming of an equalized signal associated with a subsequent one of said data symbols, and
adjusting the phase with which said samples are formed in response to a center-of-gravity signal indicative of the center of gravity of at least ones of said coefficients.

22. The invention of claim 21 wherein the $n^{th}$ of said coefficients has a value $C_n(m)$ and said center of gravity is equal to $$\frac{\sum_n n \cdot C_n(m)}{\sum_n C_n(m)}.$$

23. The invention of claim 22 wherein said coefficients are complex numbers and wherein said signal indicative of the center of gravity is the real component of said center of gravity.

24. The invention of claim 22 wherein said received signal is a modulated signal and wherein said samples are at baseband.

* * * * *